United States Patent
Liang et al.

(10) Patent No.: US 12,018,694 B1
(45) Date of Patent: Jun. 25, 2024

(54) BEARING OIL REPLENISHING STRUCTURE FOR FAN

(71) Applicant: ASIA VITAL COMPONENTS CO., LTD., New Taipei (TW)

(72) Inventors: Qiang Liang, New Taipei (TW); Wen-Jun Zou, New Taipei (TW); Fei Pang, New Taipei (TW)

(73) Assignee: ASIA VITAL COMPONENTS CO., LTD, New Taipei (TW)

( * ) Notice: Subject to any disclaimer, the term of this patent is extended or adjusted under 35 U.S.C. 154(b) by 0 days.

(21) Appl. No.: 18/139,923

(22) Filed: Apr. 26, 2023

(30) Foreign Application Priority Data

Oct. 11, 2022 (TW) .................................. 111138478

(51) Int. Cl.
*F04D 29/063* (2006.01)
*F16C 33/66* (2006.01)
*F04D 19/00* (2006.01)

(52) U.S. Cl.
CPC ........ *F04D 29/063* (2013.01); *F16C 33/6681* (2013.01); *F04D 19/002* (2013.01); *F16C 2360/46* (2013.01)

(58) Field of Classification Search
None
See application file for complete search history.

(56) References Cited

U.S. PATENT DOCUMENTS

| 5,610,462 | A | 3/1997 | Takahashi | |
|---|---|---|---|---|
| 2006/0284503 | A1* | 12/2006 | Lin | H02K 5/163 310/90 |
| 2010/0272586 | A1* | 10/2010 | Hsu | F04D 25/064 417/354 |

FOREIGN PATENT DOCUMENTS

| CN | 2338522 Y | 9/1999 |
|---|---|---|
| JP | 2020106045 A | 7/2020 |
| TW | 201600729 A | 1/2016 |
| TW | M636979 | 1/2023 |

OTHER PUBLICATIONS

Fang—CN 201827126 U + machine translation (Year: 2011).*
Search Report dated Jul. 22, 2023 issued by Taiwan Intellectual Property Office for counterpart application No. 111138478.

* cited by examiner

*Primary Examiner* — Juan G Flores
(74) *Attorney, Agent, or Firm* — Demian K. Jackson; Jackson IPG PLLC

(57) ABSTRACT

A bearing oil replenishing structure for fan includes a base of a fan and at least one oil reservoir member. The base includes a hollow shaft barrel upward extended from a central area thereof. The shaft barrel internally defines a bearing receiving hole for receiving a self-oiling bearing therein and is provided on its inner wall surface with at least one sidewall recess. The fan also includes an impeller having a shaft, which is pivotally fitted in the self-oiling bearing. The oil reservoir member is correspondingly fitted in the sidewall recess in the shaft barrel for absorbing extra lubricant oil thrown out of the self-oiling bearing due to a centrifugal force produced by the rotating shaft to therefore always store a proper amount of oil. The stored lubricant oil can be released to replenish the self-oiling bearing timely, enabling the latter to have extended service life.

4 Claims, 2 Drawing Sheets

BEARING OIL REPLENISHING STRUCTURE FOR FAN

This application claims the priority benefit of Taiwan patent application number 111138478 filed on Oct. 11, 2022.

FIELD OF THE INVENTION

The present invention relates to the field of fan, and more particularly, to a bearing oil replenishing structure for fan.

BACKGROUND OF THE INVENTION

A fan is a key part in a heat dissipation system, and it is very important to increase the service life and the reliability of the fan to ensure stable operation of the heat dissipation system. Among others, the lubricating design for a bearing of the fan is particularly important to extended service life and reduced noise production of the fan. This is because poor bearing lubricating effect would cause wearing of the bearing, which in turn decreases the fan service life and increases fan noise production during operation.

Generally, the fan has a rotational shaft pivotally connected to the bearing, so that the rotational shaft and other parts in direct contact therewith do not wear so quickly. A commonly used bearing is a self-oiling bearing, i.e. a sleeve bearing, which is featured by low cost and low noise production in early stage operation, and is therefore widely applied to fans, including axial fans and centrifugal fans. The self-oiling bearing has a porous structure impregnated with lubricant oil to realize self-oiling. The porous structure is generally formed of a sintered metal or alloy material to serve as lubricant oil storage means. The amount of lubricant oil that can be stored in the self-oiling bearing is determined by the porosity of the porous structure of the self-oiling bearing. However, since the porosity is largely restricted by the available manufacturing technology, the amount of the lubricant oil that can be stored in the conventional self-oiling bearing is not high. After the fan has operated over a certain period of time, the lubricant oil stored in the self-oiling bearing would be thrown out of the bearing gradually due to a centrifugal force produced by the rotating shaft. When the lubricant oil stored in the self-oiling bearing decreases to a certain degree, the metal contact between the self-oiling bearing and the rotational shaft increases to result in rapid wearing of the bearing and the shaft, as well as lowered bearing performance and reduced service life of the self-oiling bearing. In some worse condition, all the stored lubricant oil is thrown out of the self-oiling bearing. In the case there is not lubricant oil between the self-oiling bearing and the rotational shaft, the rotational shaft tends to be stuck in the bearing to damage the whole fan.

To solve the physical problem that the lubricant oil stored in the conventional self-oiling bearing would be thrown out centrifugally, related manufacturers try to provide a plurality of spaced recesses on an inner wall surface or an inner bottom surface of a shaft barrel of the fan, and the recesses can hold more lubricant oil in the fan. While the above way can extend the service life of the self-oiling bearing, it does not effectively solve the fact that the lubricant oil in the self-oiling bearing will be thrown out to gradually decrease when the fan rotates at a high speed.

Further, in the course of assembling or transporting the fan, the lubricant oil in the recesses tends to spill to an outer side of the shaft barrel when the fan is moved, such as being turned over, tilted or shaken, which in turn causes the problem of shortened service life of the fan and the self-oiling bearing.

It is therefore an important issue in the field of self-oiling bearing design as how to maintain the stored lubricant oil and the service life of the self-oiling bearing.

SUMMARY OF THE INVENTION

A primary object of the present invention is to provide a bearing oil replenishing structure for fan, which can absorb and store extra lubricant oil that is thrown out of a self-oiling bearing of the fan due to a centrifugal force produced by a rotating shaft of the fan, and the stored lubricant oil can be replenished to the bearing timely, enabling the self-oiling bearing to have extended service life.

Another object of the present invention is to provide a bearing oil replenishing structure for fan, which extends the service life of the fan using same.

To achieve the above and other objects, the bearing oil replenishing structure for fan according to the present invention includes a base of a fan and at least one oil reservoir member. The base includes a hollow shaft barrel upward extended from a central area thereof. The shaft barrel internally defines a bearing receiving hole for receiving a self-oiling bearing therein and is provided on its inner wall surface with at least one sidewall recess. The fan also includes an impeller having a shaft, which is pivotally fitted in the self-oiling bearing. The oil reservoir member is fitted in the sidewall recess in the shaft barrel for absorbing extra lubricant oil that is thrown out of the self-oiling bearing due to a centrifugal force produced by the rotating shaft to therefore always store a proper amount of oil. The oil reservoir member has a porous structure, a spongy structure, a foam-like structure, or a foamed structure.

The oil reservoir member of the present invention can store a certain amount of lubricant oil, and can also absorb extra lubricant oil being thrown out of the self-oiling bearing due to a centrifugal force produced by the rotating shaft of the fan. The lubricant oil in the oil reservoir member can be released timely to replenish the self-oiling bearing, so as to enable extended service life of the self-oiling bearing.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention provides a bearing oil replenishing structure for fan, which will now be described with some preferred embodiments thereof.

Figure 1:
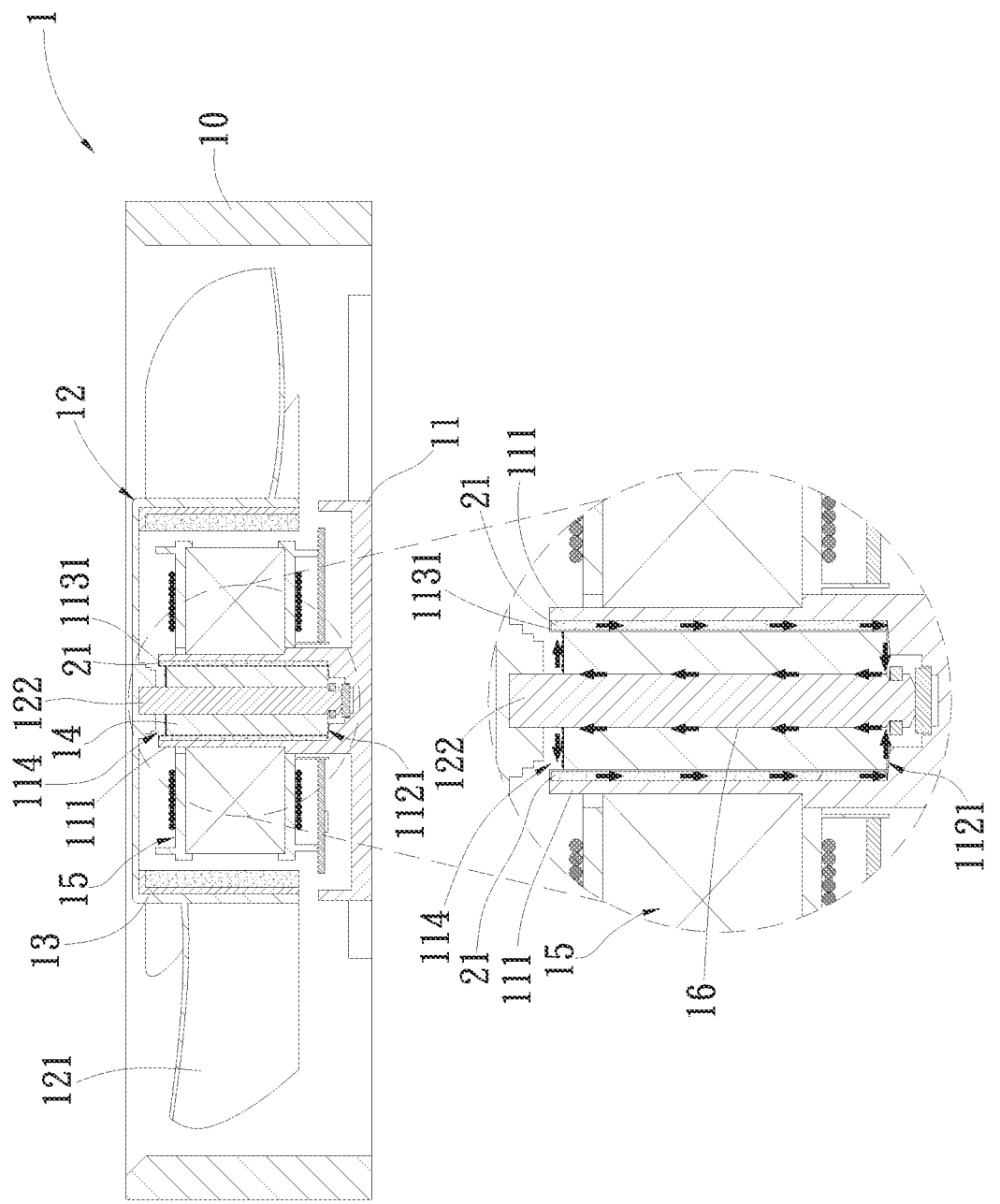
FIG. 1 shows an assembled sectional side view of a bearing oil replenishing structure for fan according to a preferred embodiment of the present invention and an enlarged view of the circled area thereof.
Figure 2:
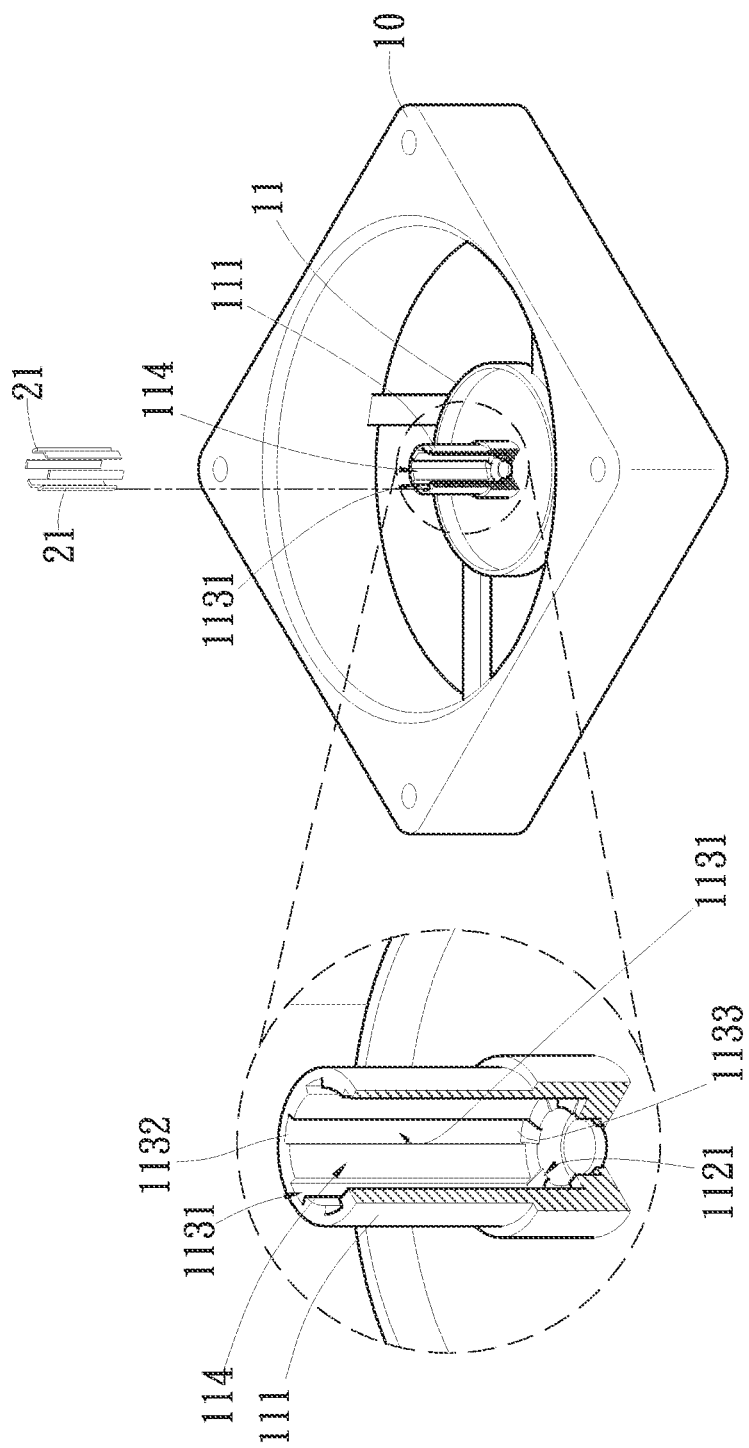
FIG. 2 shows an exploded perspective view of the bearing oil replenishing structure for fan shown in FIG. 1 and an enlarged cutaway view of the circled area thereof.

Please refer to FIGS. 1 and 2. The bearing oil replenishing structure for fan includes a base 11 of a fan 1 and at least one oil reservoir member 21. In the preferred embodiment, the base 11 is illustrated as a base 11 provided in a frame 10 of the fan 1, which can be an axial fan including an impeller 12 having a plurality of blades 121 and located in the frame 10 to be pivotally connected to the base 11. It is understood the above illustration is non-restrictive, and the base 11 can be otherwise a base of a centrifugal fan 1 or a frameless fan 1.

The base 11 includes a hollow shaft barrel 111 upward extended from a central area thereof. The shaft barrel 111 internally defines a bearing receiving hole 114 for receiving a self-oiling bearing 14 (i.e. a bearing made of a porous metal material) therein. A shaft 122 of the impeller 12 is rotatably fitted in the self-oiling bearing 14 with a lubricating clearance 16 left between the shaft 122 and the self-oiling bearing 14, so that the shaft 122 is spaced from but lubricated by the self-oiling bearing 14 to avoid metal contact friction between them. A stator 15 is externally fitted around the shaft barrel 111; and the impeller 12 is located outside the stator 15 to cover the same. A magnetic member 13, such as a magnet, is provided inside the impeller 12 corresponding to the stator 15 to produce a magnetically induced excitation between the magnetic member 13 and the stator 15.

As can be seen in FIGS. 1 and 2, the shaft barrel 111 is provided on its inner wall surfaces with at least one bottom recess 1121 and at least one sidewall recess 1131. In the illustrated preferred embodiment, there is a plurality of spaced bottom recesses 1121 and a plurality of spaced sidewall recesses 1131 provided on an inner bottom surface and an inner sidewall surface of the bearing receiving hole 114, respectively. Specifically, the sidewall recesses 1131 are elongated in shape to extend parallel to the shaft 122 and are spaced axially on the inner sidewall surface of the bearing receiving hole 114. All the sidewall recesses 1131 are located adjacent or adjoining an outer side of the self-oiling bearing 14. Each of the sidewall recesses 1131 has an upper opening 1132 and a lower opening 1133 located at an upper and a lower end thereof, respectively. The bottom recesses 1121 are radially spaced on the inner bottom surface of the bearing receiving hole 114 and are located adjacent to a lower surface of the self-oiling bearing 14. In another operable embodiment, the bottom recesses 1121 are omitted from the shaft barrel 111.

Please refer to FIGS. 1 and 2. The oil reservoir member 21 is received in the sidewall recess 1131 of the shaft barrel 111 and is made of an oil absorbent material having a porous structure, a spongy structure, a foam-like structure, or a foamed structure for absorbing, keeping or storing lubricating oil therein. In the illustrated preferred embodiment, there is a plurality of oil reservoir members 21, the number and the shape of which are corresponding to those of the sidewall recesses 1131. That is, each of the elongated oil reservoir members 21 is set or inserted in a corresponding one of sidewall recesses 1131 with upper and lower ends thereof located in the upper opening 1132 and the lower opening 1133, respectively, of the corresponding sidewall recess 1131, such that an outer surface of each oil reservoir member 21 exposed from the corresponding sidewall recess 1131 is flush with or slightly protruded beyond the sidewall recess 1131. Further, the oil reservoir members 21 have been impregnated with lubricant oil prior to actual assembling of the present invention for replenishing an adequate quantity of oil to the self-oiling bearing 14 timely. Further, the oil reservoir members 21 are correspondingly set in the sidewall recesses 1131 and the oil contained therein is used as spare oil to increase the stored oil of the fan 1. In the course of assembling or transporting the fan 1, any lubricant oil leaked or spilled from the shaft barrel 111 can be absorbed by and kept in the oil reservoir members 21, so as to avoid the problem of leaking lubricant oil when the fan 1 is moved, turned over, or shaken.

Conventionally, the shaft 122 of the impeller 12 during rotating at high speed tends to have a high temperature, which would adversely affect the lubricant oil in the lubricating clearance 16 to cause degradation or loss of the lubricant oil. However, in the present invention, since the oil reservoir members 21 can replenish the self-oiling bearing 14 timely to compensate the lost lubricant oil, the self-oiling bearing 14 can always contain sufficient lubricant oil to maintain good rotation of the shaft 122.

When the impeller 12 of the fan 1 rotates, the lubricant oil in the self-oiling bearing 14 automatically spills into the lubricating clearance 16 between the shaft 122 and the self-oiling bearing 14 to therefore provides a lubricating effect on the shaft 122 and the self-oiling bearing 14 of the fan 1 at the same time. Any extra lubricant oil is thrown out by a centrifugal force produced by the rotating shaft 122, and the thrown out lubricant oil spills upward along the lubricating clearance 16 to a top of the self-oiling bearing 14 and is absorbed by and kept in the oil reservoir members 21. The lubricant oil absorbed by the oil reservoir members 21 will be properly released due to a self-gravity, reaching maximum oil absorption, and/or under vibration caused by the operation of the fan 1 to flow into the bottom recesses 1121 or be directly replenished to the self-oiling bearing 14 to achieve the function of bearing oil replenishment. The lubricant oil is repeatedly spilled from the lubricating clearance 16, recycled, and replenished to the self-oiling bearing 14 to ensure that the lubricant oil always exists between the shaft 122 and the self-oiling bearing 14 to thereby extend the service life of the self-oiling bearing 14 and reduce noise produced during the operation of the fan 1.

While the sidewall recesses 1131 and the oil reservoir members 21 illustrated in the preferred embodiment are elongated in shape, it is understood they are not necessarily limited to the above shape. In other operable embodiments of the present invention, the sidewall recesses 1131 and the oil reservoir members 21 can be polygonal or irregular in shape.

In an alternative embodiment, the shaft barrel 111 is further provided on the inner sidewall surface of the bearing receiving hole 114 with a radially recessed sidewall annular groove (not shown), which extends around an inner circumference of the shaft barrel 111. The sidewall annular groove is located between the upper openings 1132 of the sidewall recesses 1131 and a top of the shaft barrel 111 and is communicable with the upper openings 1132 of the sidewall recesses 1131. The sidewall annular groove has an annular oil reservoir member (not shown) received therein, such that a lower half of the annular oil reservoir member is in contact with and connected to upper ends of the oil reservoir members 21 received in the sidewall recesses 1131. The annular oil reservoir member and the oil reservoir members 21 can together absorb and keep more lubricant oil that is centrifugally thrown out by the rotating shaft 122 for replenishing to the self-oiling bearing 14 timely and further extending the service life of the self-oiling bearing 14.

In the above alternative embodiment, the annular oil reservoir member and the oil reservoir members 21 are independently formed members, which are connected to one another to form a unit. In other operable embodiments, the annular oil reservoir member and the oil reservoir members 21 may be otherwise an integrally formed unit.

In the bearing oil replenishing structure for fan according to the present invention, since the oil reservoir members 21 are porous structure, spongy structure, foam-like structure or foamed structure, they can not only keep or store a considerable amount of lubricant oil centrifugally thrown out by the shaft 122 to prevent the oil from leaking out of the operating fan 1, but also timely release the absorbed and recycled lubricant oil to replenish the self-oiling bearing 14 and always keep an oil film between the self-oiling bearing 14 and the shaft 122 even when the fan 1 has been operating over a long time. In this manner, the metal contact friction between and the wearing of the shaft 122 and the self-oiling bearing 14 can be reduced to effectively achieve the function of extended service life and reduced noise production of the fan 1.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A bearing oil replenishing structure for fan, comprising:
   a base of a fan including a hollow shaft barrel upward extended from a central area thereof; the shaft barrel internally defining a bearing receiving hole for receiving a self-oiling bearing therein and being formed on an inner wall surface with at least one sidewall recess; and the fan including an impeller having a shaft, which is rotatably fitted in the self-oiling bearing; and
   at least one oil reservoir member being correspondingly fitted in the at least one sidewall recess for storing a lubricant oil thereon; the at least one oil reservoir member also absorbing, recycling, and keeping the lubricant oil that is thrown out of the self-oiling bearing due to a centrifugal force produced by the shaft in rotating; and the lubricant oil stored in the at least one oil reservoir member being releasable to replenish the self-oiling bearing to lubricate between the self-oiling bearing and the shaft.

2. The bearing oil replenishing structure for fan as claimed in claim 1, wherein the at least one sidewall recess is a plurality of the sidewall recesses provided on the inner wall surface of the shaft barrel; the plurality of sidewall recesses being elongated in shape and axially spaced from one another; and each of the plurality of elongated sidewall recesses having one elongated oil reservoir member correspondingly fitted therein.

3. The bearing oil replenishing structure for fan as claimed in claim 2, wherein the shaft barrel is further provided on an inner bottom surface with a plurality of bottom recesses, which are radially spaced from one another.

4. The bearing oil replenishing structure for fan as claimed in claim 1, wherein the at least one oil reservoir member is made of an oil absorbent material having a structure selected from the group consisting of a porous structure, a spongy structure, a foam-like structure, and a foamed structure.

\* \* \* \* \*